United States Patent [19]

Moberly

[11] 3,862,274

[45] Jan. 21, 1975

[54] PREPARATION OF NITRILE POLYMERS WITH CYCLOALIPHATIC MERCAPTANS AS POLYMERIZATION MODIFIERS

[75] Inventor: Charles W. Moberly, Bartlesville, Okla.

[73] Assignee: Phillips Petroleum Company, Bartlesville, Okla.

[22] Filed: July 12, 1973

[21] Appl. No.: 378,633

[52] U.S. Cl. ........ 260/879, 260/79.5 C, 260/880 R, 260/880 B
[51] Int. Cl. ..... C08f 15/22, C08f 15/38, C08f 19/18
[58] Field of Search .......... 260/79.5 C, 879, 880 R, 260/880 B

[56] References Cited
UNITED STATES PATENTS 3,562,359  2/1971  Gelman .............................. 260/879
3,763,278  10/1973  Griffith .......................... 260/880 R

*Primary Examiner*—Joseph L. Schofer
*Assistant Examiner*—William F. Hamrock

[57] ABSTRACT

Cycloaliphatic mercaptans are effective polymerization molecular weight modifiers in the preparation of nitrile polymers by solution, emulsion, or suspension polymerization processes in which a polymerizable nitrile, optionally with a vinylidene group-containing or substituted vinylidene group-containing monomer copolymerizable therewith, is graft polymerized in the presence of a rubbery polymer and a free radical polymerization catalyst.

26 Claims, No Drawings

3,862,274

PREPARATION OF NITRILE POLYMERS WITH CYCLOALIPHATIC MERCAPTANS AS POLYMERIZATION MODIFIERS

FIELD OF THE INVENTION

The invention relates to polymerization systems employing a polymerization molecular weight modifier or chain regulator.

BACKGROUND OF THE INVENTION

In solution, emulsion, or suspension graft polymerization processes employing a rubbery polymer, a free radical polymerization catalyst, and a polymerizable vinylidene group-containing monomer, molecular weight modifiers or polymerization modifiers or chain transfer regulators are employed. The most common types of modifiers or chain regulators have been various aliphatic or aromatic mercaptans. The chain regulator is employed to control the length of the homopolymer and graft polymer chains, and generally tends to enhance the melt flow of the resulting polymeric product.

However, in preparing nitrile polymers, obtaining the desired molecular weight frequently has been accompanied by undesirable decreases in other properties such as toughness, impact strength, and the like. Mere employment of larger quantities of mercaptan has not provided a suitable answer, and often has been accompanied by other problems such as residual "sulfur" odor in the polymeric product.

Improved chain regulators have been and are needed in the polymerization arts.

OBJECTS OF THE INVENTION

It is an object of the invention to provide improved polymerization processes for preparation of nitrile polymers.

Other aspects, objects, and the several advantages of my invention will be apparent to one skilled in the art from the following disclosure and my appended claims.

BRIEF SUMMARY OF THE INVENTION

I have discovered that cycloaliphatic mercaptans are unusually effective as polymerization molecular weight modifiers or chain regulators in the preparation of nitrile polymers by solution, emulsion, or suspension graft polymerization processes employing a polymerizable nitrile, optionally with a vinylidene group-containing or substituted vinylidene group-containing monomer copolymerizable therewith, in the presence of a free radical polymerization catalyst and a rubbery polymer.

The cycloaliphatic mercaptans have a pronounced degree of effectiveness as compared to the usual aliphatic or aryl mercaptans, providing nitrile polymers of desirably high melt flow at moderate chain regulator usage while otherwise retaining desired physical properties.

DETAILED DESCRIPTION OF THE INVENTION

Polymerization processes employing my discovery of the use of cycloaliphatic mercaptans as molecular weight regulators include solution, emulsion, and suspension polymerization processes. In these processes a rubbery polymer is used as a base polymer, and to this is grafted a polymerizable nitrile, optionally with a vinylidene group-containing or substituted vinylidene group-containing copolymerizable monomer, and employing a free radical polymerization catalyst.

In solution polymerization, the rubbery base polymer and polymerizable monomer or monomers including at least one polymerizable nitrile are placed in solution in a suitable liquid such that they are dissolved in the solvent under the reaction conditions. The resulting graft polymer itself may be either soluble or insoluble in the solvent. In suspension polymerization, the rubbery base polymer is dissolved in polymerizable monomers including at least one polymerizable nitrile so as to form a solution therein, to which diluent may also be incorporated if desired, and vigorous agitation is employed to disperse the polymerizable solution as the discontinuous phase in the form of fine droplets in water or other suitable solvent as the continuous phase. Various types of stabilizers or suspending agents are employed to maintain the monomer droplets and to some extent these may affect eventual size of the polymer particles or beads. Emulsion polymerization is similar to the suspension system, except that the particle size is smaller, and the system is stabilized by emulsifiers and other additives to yield a latex.

Polymerization processes employing my cycloaliphatic mercaptan modifiers may be either continuous or batch, with monomers added as a batch, or in a continuous or intermittent fashion in whole or in part depending on the particular type of polymeric product desired.

CYCLOALIPHATIC MERCAPTANS

The cycloaliphatic mercaptans suitable for employment according to my invention are characterized as saturated monocyclic carbocyclic mono- or dithiol compounds. Molecular size or molecular weight of the cycloaliphatic mercaptans does not appear to be a limitation as long as the mercaptan fits the description given. The cycloaliphatic mercaptan should, of course, have sufficient solubility in the environment involved so as to act effectively as a molecular weight modifier or chain regulator. Preferably, for availability and not as a limit on operability, the mercaptans have 5 to 15 carbon atoms per molecule with 5 to 12 carbon atoms in the carbocyclic ring thereof. There can be attached to the ring one or more alkyl or mercaptosubstituted alkyl substituents, in which each of such substituents can contain 1 to 10 carbon atoms. The mercapto group or groups may be attached either directly to the carbocyclic ring, or to one or more of the acyclic hydrocarbon radicals attached to such ring.

Examples of saturated monocyclic carbocyclic mono- or dithiols include cyclopentanethiol, 2-methylcyclopentanethiol, cyclohexanethiol, 1,5-cyclooctanedithiol, cyclodecanethiol, cyclododecanethiol, 3,7,11-trimethyl-1,5-cyclododecanedithiol, 3-decylcyclopentanethiol, (mercaptomethyl)cyclohexane, (10-mercaptodecyl)cyclopentane, 1,4-bis(4-mercaptobutyl)cyclohexane, 1,3-bis(5-mercaptopentyl)cyclopentane, 3-isopropylcycloheptanethiol, 4-hexyl-1,2-cyclohexanedithiol, p-menthane-2,9-dithiol, 3-(2-mercaptoethyl)cyclohexanethiol, 4-(2-mercaptoethyl)cyclohexanethiol, and the like, and mixtures thereof.

ELASTOMER

The elastomer or rubber employed in accordance with the process of my invention can be any synthetic or natural rubber characterized as having sufficient unsaturation as to be vulcanizable, i.e., the unsaturation provides sites for graft polymerization. The unsaturated elastomers include both natural and synthetic polymers, presently preferred for versatility are the synthetic materials of random, block, branched block type, homopolymers, copolymers, one or more, or mixtures.

The synthetic elastomers include polymers of conjugated dienes such as those containing 4 to 12 carbon atoms per molecule, such as 1,3-butadiene, isoprene, piperylene, 2,4-dimethyl-1,3-butadiene, 1,3-octadiene, 4,5-diethyl-1,3-octadiene, and the like, polymerized to form homopolymers or copolymerized one with another. The conjugated diene polymers as a class include copolymers formed by polymerization of one or more polymerizable conjugated dienes with one or more copolymerizable monovinyl-substituted aromatic compounds, such as those of 8 to 20, more particularly for commercial availability 8 to 12, carbon atoms per molecule, including the presently preferred styrene, as well as various of the alkyl styrenes such as ethyl styrene, halostyrene such as 2,3-dichlorostyrene, or other copolymerizable monovinyl-substituted aromatic compounds. Copolymers of one or more polymerizable conjugated dienes with one or more polymerizable alpha,beta-olefinically unsaturated nitriles, such as acrylonitrile or methacrylonitrile, can be employed. Rubbery copolymers of one or more polymerizable conjugated dienes with one or more 1-monoolefins of 2 to 8 carbon atoms per molecule such as ethylene, propylene, 1-octene, and the like, also can be employed.

Exemplary unsaturated elastomers include cis-polybutadiene, emulsion polybutadiene, vinyl polybutadiene, cis-polyisoprene, natural rubber, GRS rubbers, butadiene/styrene copolymers, butadiene/acrylonitrile copolymers, ethylene/propylene/conjugated diene terpolymers, partially hydrogenated polybutadiene or butadiene/styrene copolymers, and various of the branched block copolymers prepared with polyvinyl or divinyl-substituted aromatic hydrocarbons or with other polyfunctional branching agents such as the silicon polyhalides as are known to the art in the preparation of rubbery polymers.

POLYMERIZABLE NITRILES

Polymerizable nitriles include alpha,beta-olefinically unsaturated nitriles. These can be represented by:

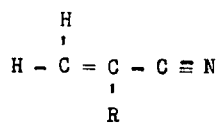

in which R can be hydrogen, or can be a lower alkyl group, preferably of 1 to 4 carbon atoms, or can be a halogen including fluorine, chlorine, bromine, or iodine. Such polymerizable nitriles include acrylonitrile, methacrylonitrile, α-chloroacrylonitrile, α-fluoroacrylonitrile, ethacrylonitrile, butacrylonitrile, and the like, alone or in admixture. Presently preferred are acrylonitrile and methacrylonitrile, one or other alone, or mixtures.

OPTIONAL COMONOMER

The olefinically unsaturated comonomer which can be employed, if desired, with the polymerizable nitrile, can be any of the copolymerizable vinylidene group-containing or substituted vinylidene group-containing monomers copolymerizable with the polymerizable nitrile in the presence of the unsaturated rubber. Preferably, these vinylidene group- or substituted vinylidene group-containing monomers contain 2 to 16 carbon atoms, due in part to greater availability. These compounds can be represented by:

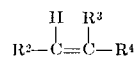

in which $R^2$ represents hydrogen or

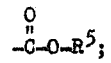

$R^3$ represents hydrogen, methyl,

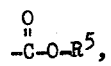

or chlorine; $R^4$ represents aryl such as phenyl, biphenylyl, or naphthyl, alkaryl, such as tolyl,

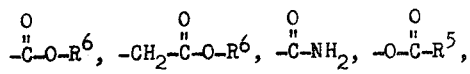

Cl, or

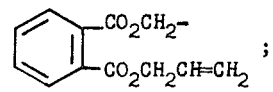

$R^5$ represents an alkyl radical of 1 to 4 carbon atoms; and $R^6$ represents hydrogen or an alkyl radical of 1 to 12 carbon atoms which can be further substituted with a cyano group.

Examples of vinylidene group- or substituted vinylidene groupcontaining monomers include styrene, α-methylstyrene, α,p-dimethylstyrene, 4-vinylbiphenyl, and 2-vinylnaphthalene; acrylate esters such as methyl acrylate, ethyl acrylate, isopropyl acrylate, butyl acrylate, octyl acrylate, dodecyl acrylate, and β-cyanoethyl acrylate; methacrylate esters such as methyl methacrylate, ethyl methacrylate, butyl methacrylate, hexyl methacrylate, octyl methacrylate, dodecyl methacrylate, and β-cyanoethyl methacrylate; acrylic acid; methacrylic acid; itaconate esters such as dimethyl itaconate, diethyl itaconate, and dibutyl itaconate; fumarate and maleate esters such as dimethyl fumarate, dimethyl maleate, diethyl fumarate, diethyl maleate, dibutyl fumarate, and dibutyl maleate; acrylamide; methacrylamide, vinyl esters such as vinyl acetate, vinyl propionate, and vinyl butyrate; vinyl chloride; vinylidene chloride; diallyl phthalate; and the like, and mixtures thereof.

POLYMERIZATION PROCESS

With respect to the polymers produced by the process of my invention, I presently prefer that about 10 to 95 weight percent, more preferably about 18 to 85 weight percent, of the polymer be derived from the nitrile monomer; preferably about 5 to 50 weight percent, more preferably about 7 to 30 weight percent, of the polymer be derived from the rubber employed; and 0 to about 75 weight percent, preferably about 4 to 70 weight percent, be derived from the olefinically unsaturated monomer copolymerizable with the nitrile. To produce polymers having compositions in these ranges, the monomer or monomers and the rubber thus employed should be employed in ratios within the above ranges.

The process of my invention can be conducted in a solution, emulsion, or suspension polymerization system. When an emulsion polymerization system is used, the system can be either an oil-in-oil emulsion or an oil-in-water emulsion. In any of these polymerization systems there is employed a free radical initiator, e.g., azo, peroxy, or redox type, such as azobisisobutyronitrile, benzoyl peroxide, isopropyl peroxydicarbonate, di-(tert-butylcyclohexyl) peroxydicarbonate, potassium persulfate, potassium persulfate-sodium bisulfite, and the like. Water-soluble initiators are preferred for use in oil-in-water emulsions. Oil-soluble initiators are preferred for use in solution, suspension or oil-in-oil emulsion polymerization systems. Although the amount of initiator can be varied over a wide range, the initiator expediently is employed in an amount of about 0.01 to 10, preferably about 0.5 to 5 to achieve desired rates of polymerization, parts by weight per 100 parts by weight of total monomer.

Although the temperature at which the polymerization is conducted can vary over a considerable range, the temperature to achieve desired rates of polymerization expediently can be within the range of about 0° C. to 100° C., preferably about 30° C. to 80° C. The polymerization time also can vary over a wide range, depending in part on the polymerization temperature, but presently suggested are times within the range of a few minutes such as about 30 minutes to many hours such as about 48 hours, preferably about 10 hours to 30 hours. The pressure need be only sufficient to maintain the monomer or monomers, and solvent or diluent, if any, substantially in the liquid phase, such as about 0 psig to 50 psig, or more. When the polymerization is conducted in a solution or oil-in-oil emulsion polymerization system, any of the usual organic solvents which are inert to the reactants can be employed, including saturated aliphatic, saturated cycloaliphatic, and aromatic hydrocarbons such as cyclohexane, methylcyclohexane, methylcyclopentane, hexane, heptane, 2,2,4-trimethylpentane, 2,2-dimethylbutane, benzene, toluene, and xylenes; ethers such as tetrahydrofuran and dioxane; alone or in admixture. Water, of course, is employed in the suspension and oil-in-water emulsion polymerization systems. Suspending agents or emulsifiers such as those known in the polymerization art can be used.

EXAMPLES

Examples supplied are intended to further illustrate the invention, and not be limitative of the reasonable and proper scope in accordance with my disclosure. Particular species employed, amounts, particular modes of polymerization, are illustrative, and not limitative.

EXAMPLE I

Various mercaptans were evaluated as modifiers in the copolymerization of styrene and acrylonitrile in the presence of a hydrocarbon solution of a butadiene/styrene block copolymer. The polymerization reactions were conducted in containers sealed with rubber gaskets and perforated crown caps.

A solution of Solprene* 1205 rubber, a butadiene/styrene block copolymer with a 75/25, respectively, parts by weight composition and a Mooney viscosity of 47 ML-4 at 212° F. (ASTM D 1646-63), was prepared in cyclohexane by adding these ingredients to a container, flushing with nitrogen, and warming and agitating the contents. To this solution was added the styrene and acrylonitrile monomers, the benzoyl peroxide initiator, and the mercaptan modifier. The recipe charge was as follows, phm representing parts by weight per 100 parts by weight of total monomers:

*Phillips Petroleum Company Trademark

| Component | phm |
|---|---|
| Solprene 1205 rubber | 20 |
| Cyclohexane | 468* |
| Styrene | 75 |
| Acrylonitrile | 25 |
| Benzoyl peroxide | 2 to 4 |
| Mercaptan | 1 |

*Except when tert-dodecyl mercaptan was used, 312 phm cyclohexane was employed.

The charged containers were subjected to mixing by tumbling end over end in a hot water bath for 22 hours at 70° C., after which the containers were removed and the contents, which had the appearance of latex, were coagulated in methanol and further washed twice in methanol. The recovered solid polymer was dried in vacuum at 65° C. for several hours using a nitrogen flush in the vacuum oven. The melt flow of the dried polymer was determined at 200° C. using a 5-kilogram weight by the method of ASTM D 1238-70 (Condition G). The melt flow of polymers produced through use of various mercaptans at 1 phm and the yield of polymer, including rubber charged, with benzoyl peroxide as the initiator, are summarized in Table I.

Table 1

| Run No. | Mercaptan Modifier | Melt Flow, g/10 min. | Yield of Polymer, Wt. % |
|---|---|---|---|
| 1 | Cyclohexanethiol | 15.86 | 87 |
| 2 | p-Menthane-2,9-dithiol | 3.38 | 87 |
| 3 | 3- and 4-(2-Mercaptoethyl)-cyclohexanethiol* | 1.33 | 85 |
| 4 | tert-Dodecyl mercaptan | 0.09 | 90 |
| 5 | n-Dodecyl mercaptan | 1.46 | 83 |
| 6 | 2- and 3-Pinanethiol | 0.59 | 87 |
| 7 | 10-Pinanethiol | 1.13 | 88 |
| 8 | Furfuryl mercaptan | 0.13 | 86 |

*Mixture of isomers prepared by the method of Example 1 in U.S. 3,050,452.

As shown in Table I the melt flow of polymers produced in each of Runs 1, 2, and 3 of the invention through the use, respectively, of cyclohexanethiol, p-menthane-2,9-dithiol, or 3- and 4-(2-mercaptoethyl)cyclohexanethiol was greater than that of polymers produced in control Runs 4 to 8, inclusive, by the use of tert-dodecyl mercaptan, n-dodecyl mercaptan, 2- and 3-pinanethiol, 10-pinanethiol, or furfuryl mercaptan, except for the only slightly higher melt flow value for the polymer obtained in Run 5 through use of n-dodecyl mercaptan as compared with that for the polymer obtained in Run 3 through use of 3- and 4-(2-mercaptoethyl)cyclohexanethiol. Thus, the use of cyclohexanethiol, p-menthane-2,9-dithiol, or 3- and 4-(2-mercaptoethyl)-cyclohexanethiol resulted in polymers of generally better processibility than any of the control polymers using prior art mercaptan modifiers.

EXAMPLE II

Polymerization of acrylonitrile and methyl acrylate in water containing an emulsifier in the presence of a butadiene/acrylonitrile rubber latex was conducted. Various mercaptans were evaluated to determine their effect on melt flow, and therefore processibility, of the polymer. The polymerizations were conducted in sealed containers equipped with crown caps. The recipe used was as follows:

| Component | phm |
|---|---|
| Emulsifier solution[a] | 300–400 |
| Ethylenediamine tetraacetic acid | 0.05 |
| Potassium persulfate | 0.06 |
| Butadiene/acrylonitrile rubber[b] | 9 |
| Acrylonitrile | 70 |
| Methyl acrylate | 30 |
| Mercaptan | 1 or 2 |

[a] A solution of 100 parts by weight of water per 1.0 part by weight of GAFAC RE-610 emulsifier, described in U.S. 3,426,102.
[b] Added as Firestone FRN-255 latex (61 weight percent solids; butadiene:acrylonitrile weight ratio of 66:34).

The polymerizations were conducted for 22 hours at 70° C. Upon completion of polymerization, each emulsion was coagulated by adding saturated aluminum sulfate (alum) while stirring, diluting with water, and filtering, followed by two washes with deionized water. The resulting polymers were air dried at about 25° C. and then vacuum dried at about 65° C. using a nitrogen sweep in the oven. The melt flow of the dried polymers was determined as in Example I. The melt flow of the polymers produced through use of various mercaptans and the yield of polymer, including rubber charged, are summarized in Table II.

Table II

| Run No. | Mercaptan Modifier | phm | Melt Flow g/10 min. | Yield of Polymer, Wt. % |
|---|---|---|---|---|
| 9 | Cyclohexanethiol | 1 | 0.57 | 97 |
| 10 | p-Menthane-2,9-dithiol | 1 | 0.37 | 98 |
| 11 | 3- and 4-(2-Mercaptoethyl)-cyclohexanethiol | 1 | 0.84 | 98 |
| 12 | n-Dodecyl mercaptan | 1 | 0.06 | 97 |
| 13 | 2- and 3-Pinanethiol | 1 | 0.14 | 96 |
| 14 | 10-Pinanethiol | 1 | 0.12 | 96 |
| 15 | Cyclohexanethiol | 2 | 2.22 | 96 |
| 16 | 3- and 4--(2-Mercaptoethyl)-cyclohexanethiol | 2 | 1.79 | 98 |
| 17 | tert-Octyl mercaptan | 2 | 0.03 | 95 |
| 18 | tert-Dodecyl mercaptan | 2 | 0.07 | 97 |
| 19 | n-Dodecyl mercaptan | 2 | 1.12 | 107 |
| 20 | 2- and 3-Pinanethiol | 2 | 0.17 | 93 |
| 21 | 10-Pinanethiol | 2 | 0.42 | 98 |

The melt flow of polymers produced in Runs 9, 10, 11, 15, 16, according to my invention, through the use of cyclohexanethiol, p-menthane-2,9-dithiol, or 3- and 4-(2-mercaptoethyl)cyclohexanethiol each was much greater than that of polymers produced through use of tert-octyl mercaptan, n-dodecyl mercaptan, tert-dodecyl mercaptan, 2- and 3-pinanethiol, or 10-pinanethiol, when used at comparable concentration. Thus, the use of cycloaliphatic mercaptan modifiers according to my invention resulted in polymers of better processibility, and of good barrier properties.

The nitrile polymers produced by the process of my invention have a variety of uses. For example, they can be used in adhesive compositions such as hot melt adhesives or solvent cements, the polymers derived from use of the larger amounts of rubber being preferred for such applications. Those nitrile polymers produced through use of relatively large ratios of nitrile monomers to rubber and other monomers are particularly useful as barrier resins, e.g., in the form of films or bottles employed in packaging. The resins of lower nitrile content are especially useful as engineering plastics.

Certainly, reasonable variations and modifications of my invention are possible yet still within the scope of my disclosure and without departing from the intended scope and spirit thereof.

I claim:

1. In a graft polymerization process for preparing a nitrile polymer which comprises polymerizing at least one polymerizable vinylnitrile monomer which is an alpha,beta-olefinically unsaturated nitrile, with at least one unsaturated rubbery polymer characterized as having sufficient unsaturation to be vulcanizable, and in the presence of a free radical polymerization initiator under free radical polymerization conditions employing a molecular weight modifier, the improvement which comprises employing as said molecular weight modifier at least one cycloaliphatic mercaptan characterized as a saturated monocyclic carbocyclic mono- or dithiol compound containing 5 to 15 carbon atoms per molecule with 5 to 12 carbon atoms in the carbocyclic ring thereof,
wherein said process employs said vinylnitrile and said unsaturated rubber in proportions sufficient such that said nitrile polymer contains about 10 to 95 weight percent derived from said vinyl-nitrile, about 5 to 50 weight percent from said unsaturated rubbery polymer and wherein said process further can employ an olefinically unsaturated copolymerizable comonomer which is a vinylidene group-containing or substituted vinylidene group-containing monomer, other than said alpha,beta-olefinically unsaturated nitrile, such that the resulting nitrile polymer contains from 0 to about 75 weight percent derived from said olefinically unsaturated copolymerizable comonomer.

2. The process according to claim 1 wherein said cycloaliphatic mercaptan is cyclopentanethiol, 2-methylcyclopentanethiol, cyclohexanethiol, 1,5-cyclooctanedithiol, cyclodecanethiol, cyclododecanethiol, 3,7,11-trimethyl-1,5-cyclododecanedithiol, 3-decylcyclopentanethiol, (mercaptomethyl)cyclohexane, (10-mercaptodecyl)cyclopentane, 1,4-bis(4-mercaptobutyl)-cyclohexane, 1,3-bis(5-mercaptopentyl)-cyclopentane, 3-isopropylcycloheptanethiol, 4-hexyl-1,2-cyclohexanedithiol, p-menthane-2,9-dithiol, 3-(2-mercaptoethyl)cyclohexanethiol, 4-(2-mercaptoethyl)cyclohexanethiol or mixtures thereof.

3. The process according to claim 1 wherein said polymerization process is a solution, emulsion, or suspension polymerization process.

4. The process according to claim 3 wherein said free radical initiator is an azo, peroxy, or redox initiator system.

5. The process according to claim 4 wherein said free radical initiator is azobisisobutyronitrile, benzoyl peroxide, isopropylperoxydicarbonate, di-(tert-butylcyclohexyl)peroxy dicarbonate, potassium persulfate, or potassium persulfate-sodium bisulfide.

6. The process according to claim 4 wherein said polymerization process employs said free radical initiator in an amount sufficient to provide about 0.01 to 10 parts by weight of said initiator per 100 parts by weight of total monomer.

7. The process according to claim 6 wherein said polymerization conditions include a polymerization temperature of about 0°C. to 100°C., employing a time of up to about 48 hours, and a polymerization pressure sufficient to maintain reactant substantially in the liquid phase.

8. The process according to claim 1 wherein said alpha,betaolefinically unsaturated nitrile can be represented by

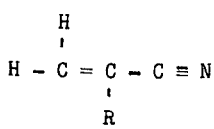

wherein R is hydrogen, alkyl group of up to 4 carbon atoms, or halogen.

9. The process according to claim 8 wherein said alpha,beta-olefinically unsaturated nitrile is acrylonitrile, methacrylonitrile, alphachloroacrylonitrile, alpha-fluoroacrylonitrile, ethacrylonitrile, butacrylonitrile, or mixture of two or more of these.

10. A process according to claim 1 wherein said olefinically unsaturated comonomer is represented by

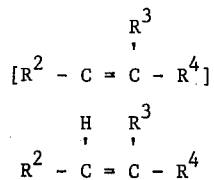

wherein $R^2$ represents hydrogen or $-C-O-R^5$; $R^3$ represents hydrogen, methyl,

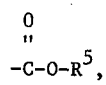

or chlorine; $R^4$ represents aryl or alkaryl,

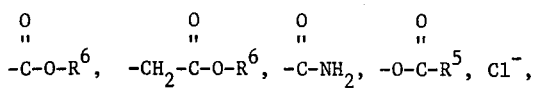

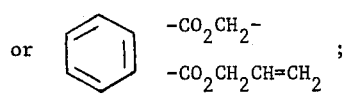

$R^5$ represents an alkyl radical of 1 to 4 carbon atoms; and $R^6$ represents hydrogen or an alkyl radical of 1 to 12 carbon atoms which can be further substituted with a cyano group.

11. The process according to claim 10 wherein said olefinically unsaturated comonomer is styrene, alphamethylstyrene, alpha,p-dimethylstyrene, 4-vinylbiphenyl, 2-vinylnaphthalene, methylacrylate, ethylacrylate, isopropylacrylate, butylacrylate, octylacrylate, dodecylacrylate, beta-cyanoethylacrylate, methylmethacrylate, ethylmethacrylate, butylmethacrylate, hexylmethacrylate, octylmethacrylate, dodecylmethacrylate, beta-cyanoethylmethacrylate, acrylic acid, methacrylic acid, dimethyl itaconate, diethyl itaconate, dibutyl itaconate, dimethyl fumarate, dimethyl maleate, diethyl fumarate, diethyl maleate, dibutyl fumarate, dibutyl maleate, acrylamide, methacrylamide, vinyl acetate, vinyl propionate, vinyl butyrate, vinyl chloride, vinylidene chloride, diallyl phthalate, or mixture of two or more thereof.

12. The process according to claim 10 wherein said unsaturated rubbery polymer characterized as vulcanizable is a natural or synthetic polymer, and where synthetic is a random, block, branched block, homopolymer, or copolymer.

13. The process according to claim 4 wherein said rubbery polymer is a synthetic elastomer and is a conjugated diene polymer.

14. The process according to claim 16 wherein said conjugated diene polymer is a homopolymer, copolymer of two or more conjugated dienes, or copolymer of at least one conjugated diene with at least one copolymerizable monomer wherein said copolymerizable monomer is a monovinyl-substituted aromatic compound, an alpha,beta-olefinically unsaturated nitrile, or 1-monoolefin monomer.

15. The process according to claim 14 wherein said conjugated diene contains 4 to 12 carbon atoms per molecule, said monovinyl-substituted aromatic compound contains 8 to 20 carbon atoms per molecule, and said 1-monoolefin contains 2 to 8 carbon atoms per molecule.

16. The process according to claim 15 wherein said conjugated diene is 1,3-butadiene, isoprene, piperylene, 2,4-dimethyl-1,3-butadiene, 1,3-octadiene, 4,5-diethyl-1,3-octadiene; said monovinyl-substituted aromatic compound is styrene, ethyl styrene, or halostyrene; said alpha,beta-olefinically unsaturated nitrile is acrylonitrile or methacrylonitrile; and said 1-monoolefin is ethylene, propylene, or 1-octene.

17. The process according to claim 14 wherein said unsaturated elastomer is cis-polybutadiene, emulsion polybutadiene, vinyl polybutadiene, cis-polyisoprene, natural rubber, GRS rubber, butadiene/styrene copolymer, butadiene/acrylonitrile copolymer, ethylene/propylene/conjugated diene terpolymer, partially hydrogenated polybutadiene or butadiene/styrene copolymer, or branched block copolymer branched with a polyvinyl aromatic compound or with a silicon polyhalide.

18. The process according to claim 13 wherein said unsaturated rubber is a butadiene/styrene block copolymer containing a weight ratio of about 75/25 copolymerized butadiene/styrene.

19. The process according to claim 18 wherein said vinyl nitrile is acrylonitrile, and said copolymerizable ethylenically unsaturated monomer is styrene, said free radical initiator is benzoyl peroxide, and said cycloaliphatic mercaptan is cyclohexane thiol.

20. The process according to claim 18 wherein said vinyl nitrile is acrylonitrile, and said copolymerizable ethylenically unsaturated monomer is styrene, said free radical initiator is benzoyl peroxide, and said cycloaliphatic mercaptan is p-menthane-2,9-dithiol.

21. The process according to claim 18 wherein said vinyl nitrile is acrylonitrile, and said copolymerizable ethylenically unsaturated monomer is styrene, said free radical initiator is benzoyl peroxide, and said cycloaliphatic mercaptan is an admixture of 3- and 4-(2-mercaptoethyl)-cyclohexane thiol.

22. The process according to claim 13 wherein said unsaturated rubber is butadiene/acrylonitrile rubber.

23. The process according to claim 22 wherein said vinyl nitrile is acrylonitrile, said olefinically unsaturated comonomer is methyl acrylate, said free radical initiator is potassium persulfate, and said cycloaliphatic mercaptan is cyclohexane thiol.

24. The process according to claim 22 wherein said olefinically unsaturated comonomer is methyl acrylate, said free radical initiator is potassium persulfate, and said cycloaliphatic mercaptan is p-menthane-2,9-dithiol.

25. The process according to claim 22 wherein said vinyl nitrile is acrylonitrile, said olefinically unsaturated comonomer is methyl acrylate, said free radical initiator is potassium persulfate, and said cycloaliphatic mercaptan is an admixture of 3- and 4-(2-mercaptoethyl)cyclohexane thiol.

26. The process according to claim 1 wherein said nitrile polymer contains about 18 to 85 weight percent copolymerized vinyl nitrile, about 7 to 30 weight percent grafted unsaturated rubber, and about 4 to 70 weight percent derived from said olefinically unsaturated comonomer.

* * * * *

UNITED STATES PATENT OFFICE
CERTIFICATE OF CORRECTION

Patent No. 3,862,274  Dated January 21, 1975

Inventor(s) Charles W. Moberly

It is certified that error appears in the above-identified patent and that said Letters Patent are hereby corrected as shown below:

Column 9, lines 31 to 34, delete "$[R^2 - C = \overset{R^3}{C} - R^4]$", also line 36, delete the underscoring. Column 10, line 6, delete "10" and insert -- 8 --; line 11, delete "4" and insert -- 12 --; line 14, delete "16" and insert -- 13 --.

Signed and sealed this ?th day of April 1975.

(SEAL)
Attest:

RUTH C. MASON
Attesting Officer

C. MARSHALL DANN
Commissioner of Patents
and Trademarks